United States Patent [19]

Hirayama

[11] Patent Number: 5,103,406
[45] Date of Patent: Apr. 7, 1992

[54] IMAGE PRINTING SYSTEM
[75] Inventor: Yoshihiko Hirayama, Tokyo, Japan
[73] Assignee: Seiko Instruments Inc., Japan
[21] Appl. No.: 539,722
[22] Filed: Jun. 15, 1990
[51] Int. Cl.$^5$ .............................................. G06K 15/00
[52] U.S. Cl. .................................... 364/519; 371/47.1
[58] Field of Search .............................. 364/518–520, 364/235 MS, 930 MS, 241 MS, 241.1 MS, 242.5 MS, 940 MS, 940.4 MS, 940.5 MS, 942.2 MS; 346/154; 371/16.5, 29.1, 30, 47.1

[56] References Cited
U.S. PATENT DOCUMENTS 4,475,195 10/1984 Carey ................................. 371/29.5
4,651,278 3/1987 Herzog et al. ...................... 364/900

Primary Examiner—Arthur G. Evans
Attorney, Agent, or Firm—Bruce L. Adams; Van C. Wilks

[57] ABSTRACT

An image printing system for printing a picture image comprises a host computer for sending commands and picture image data to a printing apparatus, the printing apparatus printing a picture image in response to the commands and picture image data sent from the host computer and being ready to receive image data in response to a print command from the host computer and ready to receive a command upon receipt of a designated number of image data. The host computer has a circuit for sending n number of a predetermined code as dummy data after sending the picture image data. The printing apparatus has a parallel interface for receiving the commands and picture image data sent from the host computer, a data transferring circuit for transferring received image data to a print head, the print head printing a picture image according to the image data, a circuit for ignoring image data after m number of the image data are received ($n > m \geq 2$) and a circuit for recognizing the received data other than the dummy data as a command from the host computer after m number of the dummy data are received, and a circuit for printing said dummy data as image data if the received image data become short.

3 Claims, 3 Drawing Sheets

IMAGE PRINTING SYSTEM

BACKGROUND OF THE INVENTION

This invention relates to an image printing system for printing digital image data sent from a computer or a signal generator, and more particularly relates to an image printing system adapted to be ready to receive image data in response to a print command from a computer or a signal generator and ready to receive a command upon receipt of a designated number of data.

In the prior art printer system, 1 byte followed by an escape code is recognized as a command. When an image is printed, the number of print lines or print dots is specified by a command from a host computer. After this, another command is entered for a graphic code, i.e., the image data reception state. Then, the command reception mode is automatically restored after the specified image data have been received.

Here, the image data of 32 gradations or more comprise data of 1 byte per each picture element so that data of three colors have 40 mega p bytes if the A3 size paper having 12 picture elements/mm. If such a large amount of data are transferred from the host computer to the printer, there may be caused by external noises a difference between the number of data sent actually by the host computer and the number of data received by the printer. Especially in the case that the interface has no parity checking function such as Centronics and the length of the cable connected between the host computer and the image printer extends a few meter this phenomenon is frequently caused. In the case of Centronics, the number of data is increased if noise enters the strobe signal at the host side. If, on the other hand, noise enters the ready (or busy) signal at the printer side and then the ready signal is masked, the data become short. This phenomenon arises probabilistically with the increase in the circumstances of many noises. FIG. 3 shows a timing chart used to explain why there arise a difference between the number of data actually received by the host computer and the number of data received by the printer. The timing chart in the normal operation is shown in the A interval. The timing chart in the state of the excess data is shown in the C interval. Noise signals enter the strobe signals sent from the host computer and a false strobe signal is generated. The false strobe signal (X) causes the data D2 to be received two times. As a result, excess data are caused. The timing chart in the state of short data is shown in the B interval. The large amplitude and low frequency noise caused by such as an electro-magnetic induction causes a fluctuation of the ground level ($Y_0$) of the busy signals. The host computer detects a busy signal ($Y_1$) as a low level signal in error and sends the next image data ($D_5$). As a result, the printer can not receive the image data ($D_5$).

If the data become excess, the data left after reception of a predetermined number of data are judged as the command and such raises problems that the printer may accomplish abnormal operations and that the printing operation is interrupted by the error state.

If the data number is short, on the contrary, the printer continues to await sufficient image data so that it is interrupted in the unprintable state or prints a subsequent command as the image. As a result, the printer may fail to perform the operation to be accomplished intrinsically by the command or may perform an abnormal operation or make a stop.

SUMMARY OF THE INVENTION

It is therefore a main object of the invention to provide an image printing system which performs normal printing operations even if the phenomenon of the mistake data number.

It is another object of the invention to provide an image printing system in which the data left after reception of a predetermined number of data ar ignored if the data become excess.

It is a further object of the invention to provide an image printing system in which dummy data are printed to perform a printing operation if the data number is short.

These and other objects of the invention are accomplished by an image printing system comprising a host computer for sending commands and picture image data to a printing apparatus, the host computer having means for sending n number of a predetermined code as dummy data after sending the picture image data; and printing apparatus adapted to be ready to receive image data in response to a print command from the host computer and ready to receive a command upon receipt of a designated number of image data, said printing apparatus having a parallel interface for receiving the commands and picture image data sent from the host computer, data transferring means for transferring received image data to a print head, and a print head for printing image picture according to the image data, means for ignoring image data after m number of the dummy data are continuously received ($n>m<2$) and means for recognizing the received data other than the dummy data as a command from the host computer after m number of the dummy data are received, and means for printing said dummy data as image data if the received image data become short.

The predetermined code may be one of the representation corresponding to the half tone.

The printing apparatus may include means for ignoring the receipt of said predetermined code after m number of the predetermined code are continuously received.

BRIEF DESCRIPTION OF THE DRAWINGS

FIG. 4(a) shows an explanation view of the normal printing operation.

FIG. 4(b) is an explanatory view of the result of the correction in the state of the short data.

FIG. 4(c) is an explanatory view of the result of the correction in the state of excess data.

DETAILED DESCRIPTION OF THE PREFERRED EMBODIMENT

Figure 2:
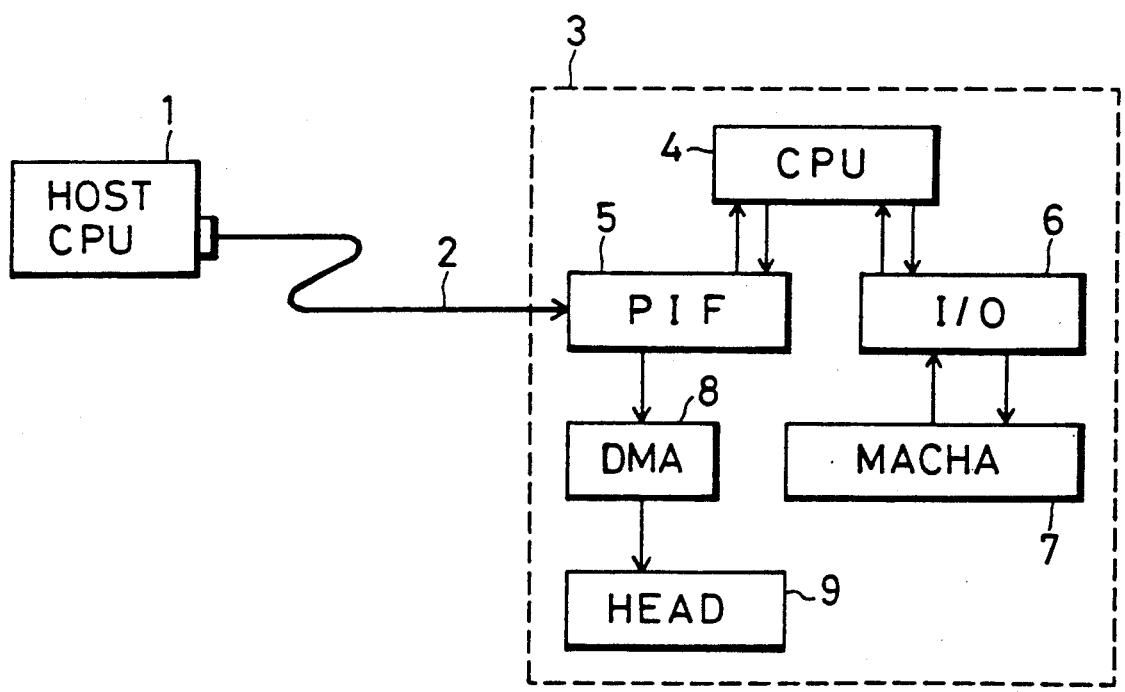
FIG. 2 shows a block diagram of an image printing apparatus.

FIG. 2 shows a hardware diagram of an image printing system in accordance with the invention. The image printing system comprises a host computer 1 and an image printer 3 connected to the host computer through a cable 2. The image printer 3 includes a CPU 4, a parallel interface 5 connected to the CPU and a host computer through the cable 2 for receiving commands and image data to be printed, an I/O port 6 connected to the CPU, a mechanism 7 of the printer connected to the I/O port, and a transfer circuit 8 for directly transferring image data from the parallel interfaces to a print head 9 such as a thermal head, an ink-jet printer head and an impact printer head.

Figure 1A:
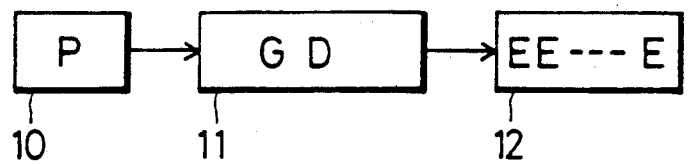
FIG. 1(a) shows the data stream of a command and data with dummy data transferred to a printer from a host computer.
Figure 1B:
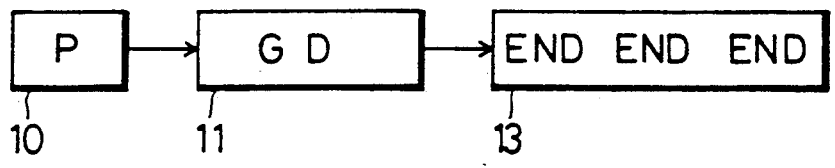
FIG. 1(b) shows the data stream of a command and data with another dummy data transferred to a printer from a host computer.
Figure 1C:
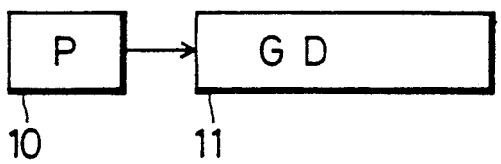
FIG. 1(c) shows the data stream of a command and data without dummy data transferred to a printer from a host computer.

FIGS. 1(a) and 1(b) show data streams according to the present invention, transferred from the host computer 1 to the parallel interface 5 through the cable 2 of one picture plane or one color. The data stream includes a command for transferring image data 10, a group of the data 11 and dummy data 12, 13 such as n sets of ASCI code of "E" (n<3) and n sets of sequentially arranged ASCI codes of "E", "N", "D" (n<2) FIG. 1(c) shows a conventional data stream without dummy data.

Figure 3:
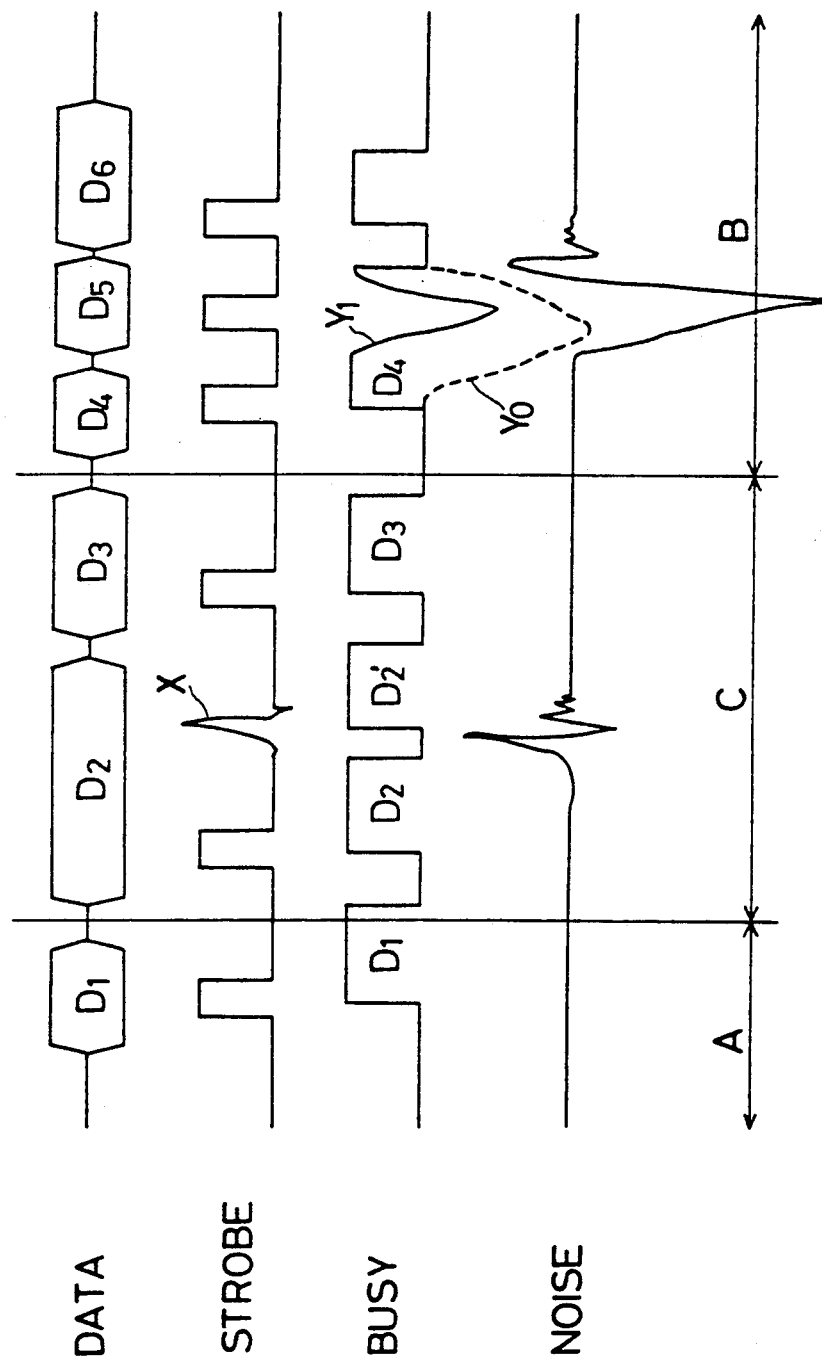
FIG. 3 shows a timing chart used to explain an abnormal operation.

FIG. 4 shows "640×1" bytes of data arranged on the picture plane to explain the influence of the data error shown in FIG. 3 to the picture plane. One picture plane is comprised of 1 lines of 640 picture elements, that is, 640 bytes per lines. FIG. 4(a) shows the normal picture plane without data error. While the data of the one picture plane are transferred if there is the interval B shown in FIG. 3, the data number become short and the picture plane becomes as shown in FIG. 4(b). In case the data stream shown in FIG. 1(c) is used, the image data on the portion of "E" is not supplied and the printer continues to await all the data prepared so that it may make a stop. Or, the printer makes a print while mistaking the code of the command of subsequent processing as the image data to stop the processing with that command so that the printer is hung up or it performs abnormal operations. In order to prevent this, the error correcting processing is accomplished by using the data stream as shown in FIG. 1(a) and FIG. 1(b). Table 1 exemplifies a BASIC program of the host computer for the printer equipped with an error correction processing command "EEE" and the program corresponds to the data processing sequence of the printer.

TABLE 1

Example of Host Computer Program

| | | | |
|---|---|---|---|
| 10 | LPRINT | "P1" | Print of First Color |
| 11 | GOSOB | *TRANS | Data Transfer Routine |
| 12 | LPRINT | "EEEEEEEEEE" | Error Processing |
| 13 | LPRINT | "P2" | Print of Second Color |
| 14 | GOSOB | *TRANS | Data Transfer Routine |
| 15 | LPRINT | "EEEEEEEEEE" | Error Processing |
| 16 | LPRINT | "P3" | Print of Third Color |
| 17 | GOSOB | *TRANS | Data Transfer Routine |
| 18 | LPRINT | "EEEEEEEEEE" | Error Processing |
| 19 | LPRINT | "F" | Discharge of One Page |

In Table 1, the subroutine "TRANS" indicates the transfer of 640 bytes per each line for 1 lines. If the printer receives three or more "E" continuously, the error correction commands of line numbers 12, 15 and 18 judges the end of the image data, and the subsequent data are accepted as the normal command by the CPU 4 in FIG. 2. If the three "E" are not continuously received, the received data is ignored as the remainder of the image data. Even if, on the other hand, the three or more "E" are continuously received, the third or later "E" are ignored. In case the image data are short, as illustrated in FIG. 4(b), the beginning "E" are printed as the image data on the position designated by E in FIG. 4(B). The host computer sends a sufficient number of "E", i.e., the summation of the three "E" necessary for the error correction and the short data number as the error correction dummy data "E". It is included in the invention that the CPU 4 recognizes that the transfer error has occurred and requests re-transferring image data to the host computer if there is a difference between the number of the received dummy data and the predetermined number of the "E". The reason why the three "E" are continuous for the error correction is that the data of the same codes as that of the "E" may probably be inputted, too, when the image data are received. Since one "E" makes the discrimination difficult three or more continuous receptions are conditioned for dropping the probability of the erroneous recognition.

Incidentally, the example of three "E" is described in the present embodiment, but the condition of four or more "E" is similarly included in the present invention. On the other hand, the reason for the use of the ASCI code of "E" as the error correction dummy data is the high probability of erroneous recognition because the image data may appear continuously in the form of "00H" in the dark portion and "FFH" in the bright portion. Thus "E" being one of the half tones having a delicate gradation and rarely having the same data continuously is used. Therefore, another code may be used according to the present invention if it is in a half tone between "00H" and "FFH". Incidentally, it is included in the invention that the dummy code is composed of a plural number of the certain codes as shown in FIG. 1(b). Although the Centronics interface is used for the description, on the other hand, another method such as SCSI or GPIB is included in the present invention. Moreover, an aberration of one picture element takes place at the l-th line of FIG. 4(b) but is usually ⅛ mm for the density of 8 picture elements per 1 mm and raises no visual problem. On the other hand, the printed "E" by the error correction is printed to have its code corresponding to the half tone and in the boundary to the frame so that it is at a level that poses no visual problem.

FIG. 4(c) illustrates the case in which noise enters the strobe signal of the Centronic interface as shown in the interval of the FIG. 3. Specifically, the data are excess because the same data are read as subsequent data by the printer due to noise while the 80th data of the l-th line is being outputted. Without any error correction, the printer performs an error operation to process the excess data as the command. In order to prevent this, the error correction is accomplished. The printer ignores as the remainder the designated number of data which are obtained after it has received the data of 640×1 picture elements and before it receives three correction commands "E". In this case, too, one picture element aberration occurs at the l-th line. Despite this fact, however, this aberration is ⅛ mm; if the density is usually about 8 picture elements for 1 mm, and raises no problem. In the case that picture images are converted into digital data through a video interface having a comparatively low resolution, displacement of the picture element may occurred by 1 dot according to the sampling timing. As the parallel interface according to the invention has a high resolution, the displacement of the picture element in this invention is more inconspicuous than that in the video interface. Accordingly, the handling of the printer is improved due to the fact that normal printing operation is comtinued without being hung up and abnormal operations in case errors occur.

The following effects can be obtained by the present invention thus far described:

(1) The erroneous operations, if any, due to noise or the like can have their influences minimized without interrupting the print.

(2) The print is neither interrupted, nor is the printer damaged by the abnormal operations caused by processing the image data as the command.

(3) If the error correction of the present invention is accomplished in the case errors occur, only one picture element is displaced for one error in the image printer so that the image aberration is hardly visible.

What is claimed is:

1. An image printing system for printing a picture image comprising:

a host computer for sending commands and picture image data, said host computer having means for sending n number of a predetermined code as dummy data after sending the picture image data; and a printing apparatus operable to be ready to receive image data in response to a print command from the host computer and ready to receive a command upon receipt of a designated number of image data, said printing apparatus having a parallel interface for receiving the commands and picture image data sent from said host computer, data transferring means for transferring received image data to a print head, the print head being operable to print a picture image according to the image data, means for ignoring image data after m number of the image data are received ($n > m < 2$) and means for recognizing the received data other than the dummy data as a command from the host computer after m number of the dummy data are received, and means for printing said dummy data as image data if the received image data become short.

2. An image printing system as claimed in claim 1 wherein said predetermined code is one of the representation corresponding to the half tone.

3. An image printing system as claimed in claim 1 wherein said printing apparatus includes means for ignoring the reception of said predetermined code after m number of said predetermined code are continuously received.

* * * * *